UNITED STATES PATENT OFFICE.

AUGUSTE ROLLAND, OF TOULOUSE, FRANCE.

IMPROVEMENT IN FERTILIZERS.

Specification forming part of Letters Patent No. 27,072, dated February 7, 1860.

*To all whom it may concern:*

Be it known that I, AUGUSTE ROLLAND, of Toulouse, France, have invented a new and important fertilizer and its application to the improvement and valuable increase of manures of the stable and farm-yard; and I do hereby declare and ascertain said invention.

My invention consists of a certain composition of ingredients which I propose to employ as a manure or fertilizer, either by itself or mixed with other substances, and is very valuable in the preparation of manure heaps composed of stable and farm-yard manure mixed with straw or other vegetable matter, by which said straw, vegetable matter, and manure can be rotted and prepared for use in a rapid and perfect manner, as will more clearly appear in the following description.

The compound is composed of the several ingredients herein named and in the proportions which I have generally found the best; but it is obvious these proportions can be changed and a similar or partially similar effect produced. For the compound I take of alum, seven parts, by weight; of sulphate of iron, twenty-nine parts, by weight; of sulphate of soda, thirty-six parts, by weight; of sulphate of lime, twenty-five parts, by weight; of sulphuric acid, three parts, by weight. Total: one-hundred parts, by weight. These several ingredients must be ground and carefully mixed together in very fine powder. This can be spread upon the ground to be manured in quantity about one hundred and fifty pounds per acre. This small quantity it is found very difficult to spread evenly over so large a surface. Therefore it is best to mix it with sand or other substance in such proportions as will readily spread over the surface, care being used to thoroughly combine the two so as to distribute the fertilizer equally over the surface when spread.

In making manure heaps by the use of this fertilizer about three pounds of the composition should be dissolved in twenty-five gallons of water. I then form a layer of stable or farm-yard manure that has been watered with the solution above named and left till the carbonate of ammonia has been taken up and it emits no odor. The layer of this manure should be six or eight inches thick, on which a layer of straw and other vegetable substance is put to the thickness (after first being saturated with water) of a foot or a foot and a half deep, more or less. On this layer of vegetable matter another layer of the manure above named is put, and then again a layer of straw, alternating them until the heap is finished with a layer of the manure. The heap of seven or eight layers begins to get hot in four or five days, and at the end of eight days or a fortnight the whole mass will be rotted and ready for use, and will be found to be a better manure than clear dung from the barn yard.

What I claim, and desire to secure by Letters Patent, is—

The mode or method of manufacturing a fertilizing compound by the employment of the ingredients herein set forth, substantially as and for the purposes described.

AUGUSTE ROLLAND.

Witnesses:
GEO. BISBEE,
JOHN NATHAN.